(12) United States Patent
Janhunen

(10) Patent No.: US 7,414,223 B2
(45) Date of Patent: Aug. 19, 2008

(54) METHOD AND APPARATUS FOR MONITORING SAFETY GLASS PRODUCTION OR CONTROLLING A TREATMENT PROCESS

(75) Inventor: Toivo Janhunen, Kangasala (FI)

(73) Assignee: Tamglass Ltd. Oy, Tampere (FI)

( * ) Notice: Subject to any disclaimer, the term of this patent is extended or adjusted under 35 U.S.C. 154(b) by 0 days.

(21) Appl. No.: 10/548,526

(22) PCT Filed: Mar. 11, 2004

(86) PCT No.: PCT/FI2004/050026

§ 371 (c)(1),
(2), (4) Date: Nov. 29, 2005

(87) PCT Pub. No.: WO2004/080905

PCT Pub. Date: Sep. 23, 2004

(65) Prior Publication Data
US 2006/0108346 A1 May 25, 2006

(30) Foreign Application Priority Data
Mar. 12, 2003 (FI) .................................. 20035031

(51) Int. Cl.
F27B 9/40 (2006.01)
C03B 29/08 (2006.01)
C03B 25/08 (2006.01)
C03B 27/044 (2006.01)
G01B 11/24 (2006.01)

(52) U.S. Cl. ................. 219/388; 219/400; 219/411; 219/502; 65/29.12; 65/29.14; 65/29.16; 65/377; 65/162

(58) Field of Classification Search .................. None
See application file for complete search history.

(56) References Cited

U.S. PATENT DOCUMENTS 3,479,172 A * 11/1969 McCown et al. .............. 65/118

(Continued)

FOREIGN PATENT DOCUMENTS

EP 0 937 687 8/1999

(Continued)

Primary Examiner—Joseph M Pelham
(74) Attorney, Agent, or Firm—Buchanan Ingersoll & Rooney PC

(57) ABSTRACT

The invention relates to a method and apparatus for monitoring safety glass production or controlling a treatment process, such as a tempering process. Information representing a load of glass panels is used in controlling a treatment process, such as heating of glass panels, or in monitoring production. The information, which includes at least one of the following: shape, size, and position, is read with one or more cameras (6). This is possible as glass is made visible by means of reflected light as high intensity light is applied to the glass surface. The line camera (6) is used for receiving low intensity background light radiation incident through the glass conveying plane, a substantial increase in its intensity, as light is reflected by glass, being deciphered as glass.

8 Claims, 2 Drawing Sheets

U.S. PATENT DOCUMENTS

| | | | |
|---|---|---|---|
| 3,779,731 A * | 12/1973 | Pollock et al. | 65/158 |
| 4,639,263 A * | 1/1987 | Kulikauskas | 65/158 |
| 4,666,493 A * | 5/1987 | Frank et al. | 65/29.12 |
| 5,007,949 A * | 4/1991 | Mathivat et al. | 65/160 |
| 5,667,549 A * | 9/1997 | Alarcon-Lopez et al. | 65/29.18 |
| 5,680,217 A | 10/1997 | Yli-Vakkuri | |
| 6,045,358 A * | 4/2000 | Kormanyos | 65/111 |
| 6,064,040 A * | 5/2000 | Muller et al. | 219/388 |
| 6,470,711 B1 * | 10/2002 | Jarvinen et al. | 65/114 |
| 6,796,144 B2 * | 9/2004 | Shepard et al. | 65/158 |
| 2003/0061834 A1 * | 4/2003 | Vitkala et al. | 65/114 |
| 2004/0237591 A1 * | 12/2004 | Shetterly et al. | 65/162 |

FOREIGN PATENT DOCUMENTS

| | | |
|---|---|---|
| EP | 0 937 687 A2 | 8/1999 |
| FI | 98757 C | 12/1996 |
| FI | 106256 B | 8/1999 |
| FI | 115626 B | 6/2005 |
| WO | 91/03434 A1 | 3/1991 |
| WO | 9103434 | 3/1991 |
| WO | 97/44286 A1 | 11/1997 |
| WO | 9744286 | 11/1997 |
| WO | WO 97/44286 | 11/1997 |
| WO | 02/18980 A2 | 3/2002 |
| WO | 0218980 | 3/2002 |

* cited by examiner

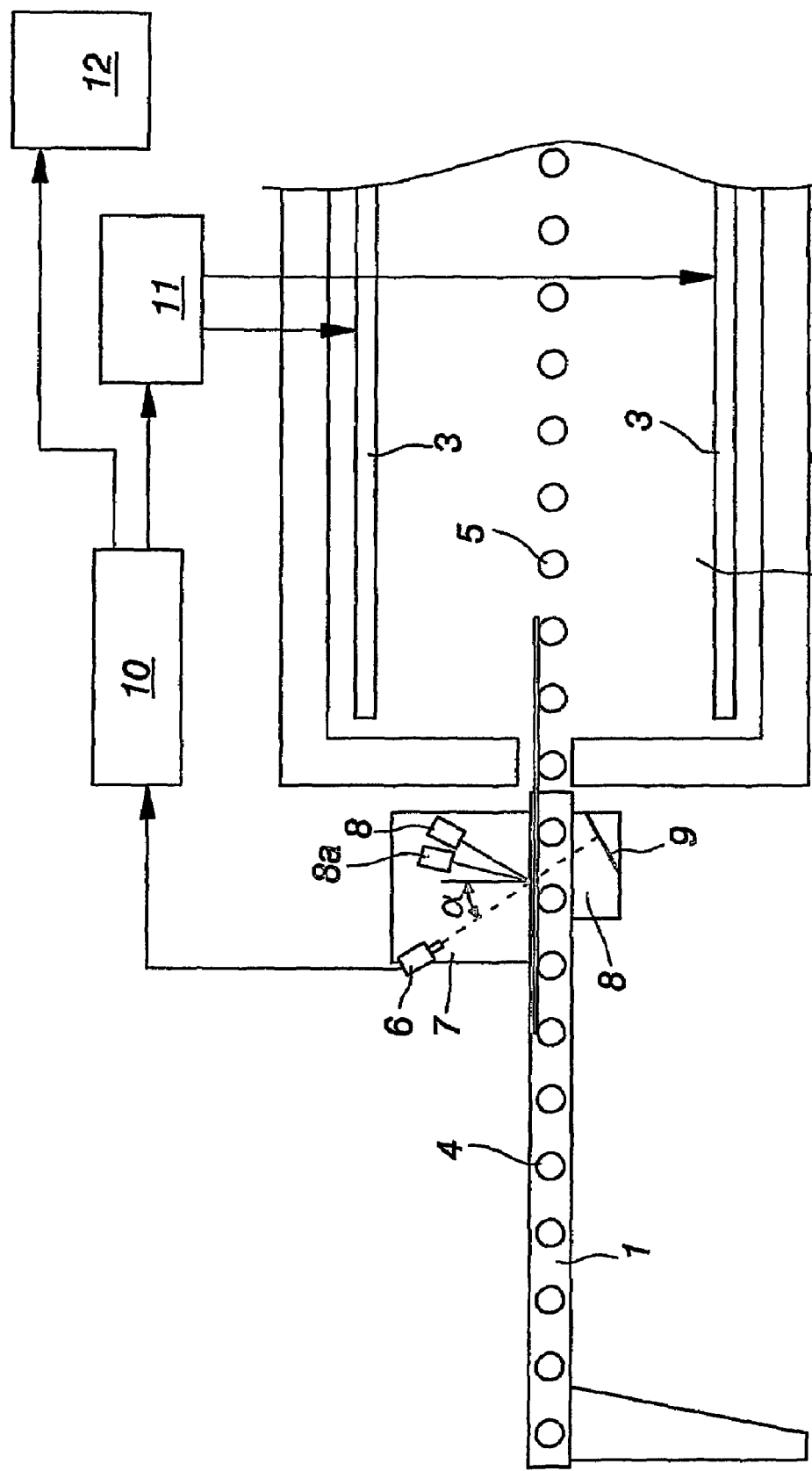

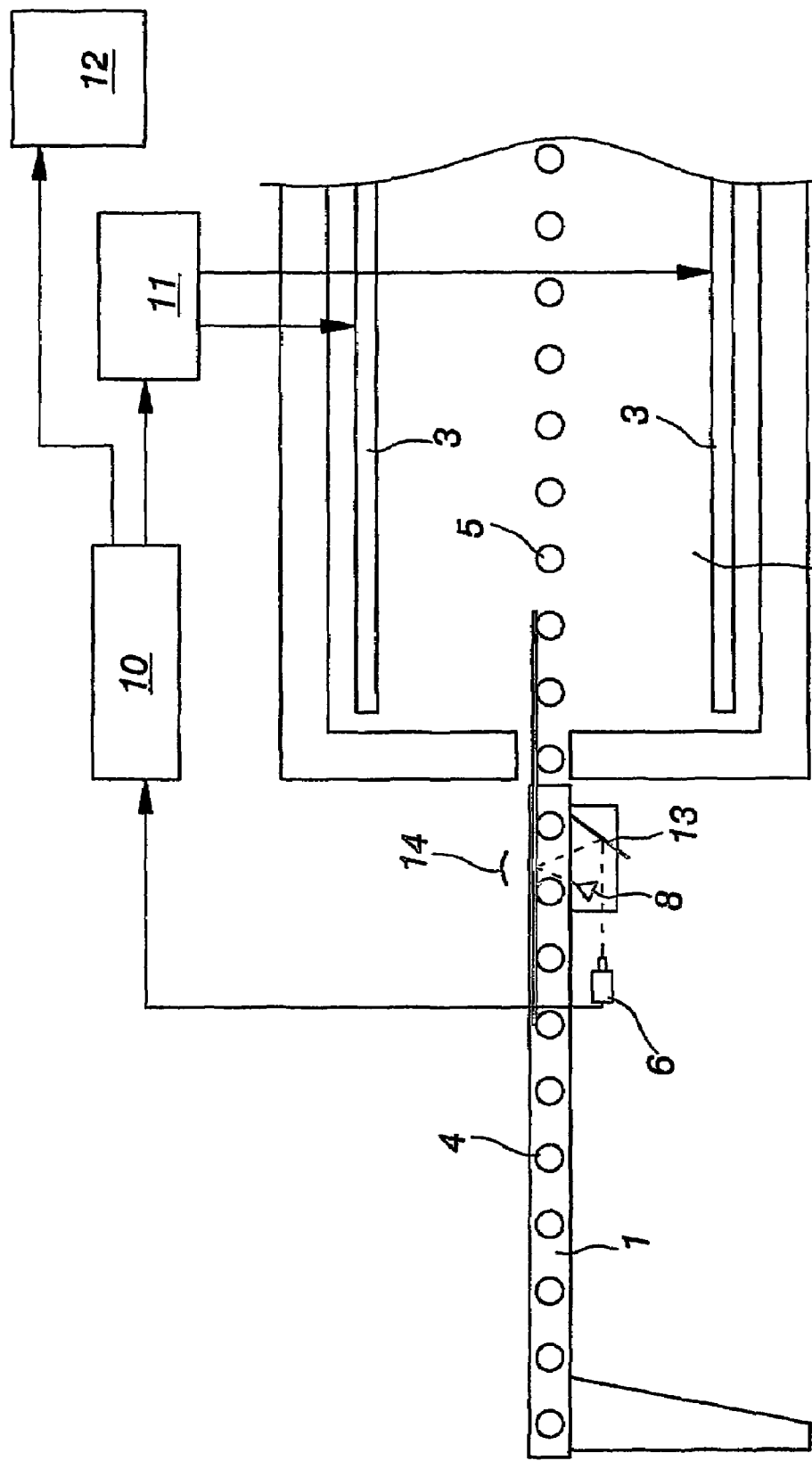

METHOD AND APPARATUS FOR MONITORING SAFETY GLASS PRODUCTION OR CONTROLLING A TREATMENT PROCESS

The invention relates to a method for monitoring safety glass production or controlling a treatment process by means of information representing a load of glass panels, said method comprising conveying flat glass panels through at least one treatment process and reading, prior to the treatment process, information which represents a load of glass panels and which is used in controlling production or process parameters or for recording and monitoring data associated therewith.

The invention relates also to an apparatus for monitoring safety glass production or controlling a treatment process by means of information representing a load of glass panels, said apparatus comprising a furnace, heating devices present in the furnace for heating glass panels for tempering or heat strengthening, a loading table, a roll conveyor for conveying glass panels from the loading table into the furnace, and a detector above or below the conveyor for reading information representing a load of glass panels.

Depending on a given application, the information representing a load of glass panels includes at least one of the following: shape, size, and position. The load involves a plurality of glasses simultaneously, possibly also side by side.

The invention is applied in a tempering or heat-strengthening process of glass panels for controlling production and heating, and preferably also for monitoring production.

This type of method and apparatus, as applied to controlling a tempering process, are known from patent publication FI-100526. There, the shape and loading data of a glass load are read by means of optical sensors mounted at the downstream end of a loading table, one for each sequence of resistances in the furnace. A detector constituted by discrete sensors is expensive, nor has it a particularly good dimensional accuracy. Neither are discrete detectors capable of providing reliable information regarding the size of glass pieces constituting a load.

Publication WO 02/18980 discloses a method and apparatus for monitoring the optical quality of glass surface with a camera, into which is focused light reflected from the glass surface. The question is about monitoring performed after a treatment process.

Publication WO 91/03434 discloses an apparatus for measuring the dimension of sheeted glass panels prior to loading the glass panels on storage racks. Measuring is performed by means of glass-reflected light and a camera. This does not involve a simultaneous examination for the entire surface area and position of several glass panels, nor is the information used for a glass-panel treatment process, but solely for the selection of a proper storage rack, one glass panel at a time.

It is an object of the invention to provide a method and apparatus of the above type, which are attractive in terms of price and which have a high dimensional accuracy, whereby the information can be used for the real-time control of a treatment process and also for monitoring production, as desired.

This object is fulfilled with a method of the invention in such a way that high intensity light is applied to a conveying plane, in which a plurality of glass panels travel towards a tempering or heat-strengthening process, and information representing a load is read by means of a camera or cameras, which is or are directed to see directly or by way of a mirror the light reflected from the glass, and that the information representing a load is used in the tempering or heat-strengthening process in controlling a heating device for glass panels.

According to a preferred embodiment, information is read by means of at least one line camera used for receiving low intensity background light radiation incident through the glass conveying plane, a substantial increase in its intensity, as light is reflected by glass, being deciphered as glass.

An apparatus of the invention is characterized in that the detector comprises at least one line camera, which is directed to see directly or by way of a mirror the light reflected from the glass, that the apparatus comprises a high intensity light source which illuminates the glass present within the line camera's visual field, and that the camera is connected to a control device for controlling a heating device for glass panels.

A sufficient resolution is achievable by using an illuminator constituted by a powerful high-frequency fluorescent tube, and a camera constituted by a grey-scale line camera with a sufficient resolution. In conducted tests, a camera capable of detecting 256 intensity values provided a discrepancy of 30 intensity values in the case of all flat-type glasses and a discrepancy of 10 intensity values in the case of glasses with an uneven surface. This is sufficient for a reliable identification of the edge and glass surface.

In the Applicant's earlier application FI-20030005, the detection of glass is effected by means of grey-scale resolution and UV light, which is used for visualizing residues of tin in glass surface or for illuminating through a glass conveying plane.

A benefit gained by the present invention over the previous one is that the use of hazardous UV light is avoided or that the use of UV light is limited to function only as auxiliary lighting, and that such glasses are also detected which have no residues of tin. Green glass, for example, has very little residues of tin, and glass types made by pressing (typically e.g. embossed glass panels for shower cabinet walls) have absolutely no residues of tin.

The invention will now be described in more detail by way of exemplary embodiments with reference to the accompanying drawings, in which:

FIG. 1 shows in a schematic longitudinal section the upstream end of a tempering furnace provided with an apparatus implementing a method of the invention, and FIG. 2 shows the apparatus in a second embodiment the same way as in FIG. 1.

Flat glass panels to be tempered, which have a desired shape and size, are laid on a conveyor constituted by a loading table's 1 rolls 4, whereby a glass load is carried into a furnace 2, onto a conveyor constituted by rolls 5 therein. Heating of a glass load is effected for example by means of electric resistances 3 set above and below the conveyor 5. Other types of known heat sources are also available. Convection blowpipes can be mentioned as an example of these. The heating elements 3 may comprise both radiation heating equipment and convection heating equipment as an aggregate.

In view of heating control and also in view of other subsequently described purposes, it is beneficial to have as comprehensive a knowledge as possible regarding information representing a load, particularly a load rate, the positions, shapes and sizes of glass panels. Therefore, in the embodiment of FIG. 1 towards the downstream end of a loading table 1, a short stretch of conveyor is enclosed in a housing 7 which is provided with high intensity light sources 8 for lighting a glass load from above. The light sources 8 may comprise conventional high-frequency fluorescent lamps operating within the range of visible light. The light source 8 may also comprise an array of LED's covering the conveyor's entire width. This brings the advantage that the length of a light source is not limited to the length of available lamps. The illuminated glass surfaces are made visible to a camera 6 and distinctive from e.g. a black background 9. The line camera 6 has its visual field focused in line with a gap between the loading table's 1 rolls 4, and the black background surface 9 lies behind this inter-roll gap below the conveyor. The background surface 9 is usually black, but can also be otherwise distinctive from the reflective glass surface. Intensity of the light source 8 can be adjustable or automatically self-adjusting according to the reflection of glass.

The line camera 6 is aimed towards a conveying plane of glass panels at an acute angle relative to a normal of the conveying plane, which forms a suitable angle of reflection α. The angle α is typically within the range of 20°-45°, e.g. about 30°-40°. The light source 8 is respectively positioned and aimed in such a way that the light coming from an angle of incidence matching the angle of reflection α has a high intensity. The line camera 6 is used for receiving slight background light radiation coming through the glass conveying plane, a substantial increase of its intensity being deciphered as glass because, by virtue of the arrangement, the camera 6 sees light which reflects from the glass.

The embodiment of FIG. 2 only differs from the preceding one in the sense that the light source 8 and the camera 6 are both set below the loading table 1, and the propagation direction of light reflected from the bottom surface (and possibly also from the top surface) of glass is deflected with a mirror 13 towards the camera 6. Thus, the camera 6 can be set at a sufficient distance relative to a reflection point without positioning problems. On the other hand, there will be no inconvenient and protectable structures above the loading table 1, just a screen or background 14, which is a non-reflecting, preferably black matte soffit.

As glass travels on the conveyor 4, the conveyor pulses can be synchronized to the camera's line frequency for providing dense dot-matrix type information regarding an area or areas having glass present.

A common type of line camera comprises a camera with a resolution of 2048 pixels and a capacity to distinguish 256 shades of grey. This common and inexpensive basic camera is sufficient for purposes of the invention. If the conveyor has a maximum width of 3000 mm, the resulting pixel size of 1.46 mm will be obtained with a single 2048-pixel camera. If there is a wobble of one pixel at both edges, the accuracy will be 3 mm. With three 2048-pixel cameras, the pixel size will be 0.488 mm, whereby the dimensional accuracy is at least 1 mm. With a single 8192-pixel camera, the accuracy will be even better. In most cases, practical demands can be met with just one 2048-pixel camera, since glass can be identified even from a measurement performed at the accuracy of 3 mm. Programmatically it is possible to provide a resolution even higher than one pixel.

From the loading table 1 there is obtained dot-matrix information the size of e.g. 2048 pixels×3277 pixels (3000×4800 mm), indicating which dots have glass and which do not.

Information representing a load is passed to a control device 10, wherein the information can be processed in various ways. In this exemplary embodiment, this information is applied specifically for controlling the resistances 3 and/or other heating devices and for working out heating profiles. For this purpose, the conveyor is divided in lanes having a width equal to a single resistance 3 (e.g. 100 mm).

Lengthwise evaluation is effected by measuring the length of a load and by checking whether a load is continuous or consisting of several lengths. It is concluded programmatically in the control unit 10 or 11 as to whether various lanes require different heating effects because of discrepant lengths. If desired, it is also possible to control lengthwise distributed heating devices.

Lateral evaluation for required heating is effected by visually checking which heating devices (which lanes) have glass thereunder and which heating devices do not have glass thereunder. Necessary heating effects are evaluated with a desired equation for working out a desired crosswise heating profile. This enables a virtually real-time response to a heating demand, thus providing a better temperature balance for the furnace.

The invention can also be utilized for the identification of broken glasses and for the discrimination of glasses destined for different customers. A picture of the loading conveyor 1, 4 is displayed to the operator with a monitor 12 placed in the vicinity of an unloading conveyor, who is able to see whether glass is missing at some point. If desired, the unloading conveyor can also be provided with its own camera system and, thus, the observation of missing glass can be automated.

If there is a knowledge about the size and shape of a glass piece, the glass can be identified and labels can be printed for the unloading end operator for attachment to glasses (customer and glass information). Glasses for several customers can be run in one and the same load without fear of confusing the glasses. Another conceivable application is such that the loading end operator and the unloading end operator are able to see the same picture of a load and the loading end operator marks the picture with a highlighting pen, indicating which glasses are included in a particular customer delivery.

The identification of glasses can be linked to a bar code, which enables tracking even subsequently when and at which process values a glass piece has passed through the process. This provides useful feedback information for monitoring production or checking process control parameters.

A bar code associated with each glass panel constitutes a ID-identifier, which is stored in a databank along with information relating to a production process. Thus, it is subsequently possible to check the information and process parameters that have been involved in the production process of single glasses.

The invention claimed is:

1. A method for monitoring and controlling heat treatment in safety glass production, said method comprising:

conveying flat glass panels through at least one heat treatment, reading, prior to the heat treatment, information which represents a load of glass panels and using the load information to control production or treatment parameters, wherein are the following steps applying high intensity light to a conveying plane, in which the load of glass panels travels towards a tempering or heat-strengthening treatment, and load information is read by means of at least one camera, which is directed to see by way of a mirror the light reflected from the glass, and the load information is used in the tempering or heat-strengthening treatment for controlling both radiation heating and convection heating, and the load information is also utilized for monitoring the production of glass and for recording data associated with production, wherein the high intensity light is applied to the bottom surface of the conveying panel and the light reflected therefrom is reflected with the mirror to the at least one camera positioned below the conveying plane.

2. A method as set forth in claim 1, wherein information is read by means of at least one line camera used for receiving low intensity background light radiation incident through the glass conveying plane, a substantial increase in its intensity, as light is reflected by glass, being deciphered as glass.

3. A method as set forth in claim 1, wherein information is read by means of one or more line cameras, which are able to see through a gap between rolls a background which is black or otherwise distinctive from the reflective glass surface.

4. A method as set forth in claim 1, wherein the load information is utilized in controlling a heating device, such that adjustment of a heating effect is performed in a longitudinal and/or lateral direction of the furnace in real time as the glass arrives at a respective heating point.

5. A method as set forth in claim 1, wherein the load information is utilized for identifying glass panels.

6. A method as set forth in claim 1, wherein the load information is utilized for detecting glass panels broken in the process.

7. An apparatus for monitoring safety glass production and controlling a heat treatment by means of information representing a load of glass panels, said apparatus comprising:
 a furnace,
 heating devices present in the furnace for heating glass panels for tempering or heat strengthening,
 a loading table,
 a roll conveyor for conveying glass panels from the loading table into the furnace, and
 at least one camera for reading information representing a load of glass panels, the camera being directed to see by way of a mirror the light reflected from the glass,
 means for monitoring production of the apparatus on the basis of said information, and
 a high intensity light source which illuminates the glass load present within the camera's visual field,
 wherein the high intensity light source and the at least one camera are both below the loading table, and the propagation direction of light reflected from the bottom surface is deflected with the mirror towards the camera, and
 wherein the camera is connected to a control device for controlling the heating devices for glass panels, and the heating devices comprise radiation heating equipment and convection heating equipment.

8. An apparatus as set forth in claim 7, further comprising a conveyor equipped with rolls, wherein the line camera has its visual field focused in line with a gap between the rolls, and wherein above or below this inter-roll gap is a background surface which is substantially black or otherwise distinctive from the reflective glass surface.

* * * * *